US008954887B1

(12) United States Patent
Tseng et al.

(10) Patent No.: US 8,954,887 B1
(45) Date of Patent: Feb. 10, 2015

(54) LONG PRESS INTERFACE INTERACTIONS

(75) Inventors: Erick Tseng, San Francisco, CA (US); Daniel Johansson, Malmo (SE); Michael A. Cleron, Menlo Park, CA (US); Indika C. Mendis, Mountain View, CA (US)

(73) Assignee: Google Inc., Mountain View, CA (US)

( * ) Notice: Subject to any disclaimer, the term of this patent is extended or adjusted under 35 U.S.C. 154(b) by 714 days.

(21) Appl. No.: 12/367,842

(22) Filed: Feb. 9, 2009

Related U.S. Application Data

(60) Provisional application No. 61/027,386, filed on Feb. 8, 2008.

(51) Int. Cl.
*G06F 3/048* (2013.01)
*G06F 3/0481* (2013.01)
*G06F 3/0487* (2013.01)

(52) U.S. Cl.
CPC .......... *G06F 3/04812* (2013.01); *G06F 3/0487* (2013.01)
USPC .......................................... 715/823; 715/808

(58) Field of Classification Search
CPC ............................ G06F 3/04812; G06F 3/0487
USPC .................................................. 715/808, 823
See application file for complete search history.

(56) References Cited

U.S. PATENT DOCUMENTS

| 4,896,291 | A | | 1/1990 | Gest et al. |
| 5,760,776 | A | | 6/1998 | McGurrin et al. |
| 5,828,376 | A | | 10/1998 | Solimene et al. |
| 5,862,395 | A | * | 1/1999 | Bier .................................. 712/1 |
| 6,094,197 | A | * | 7/2000 | Buxton et al. ................ 715/863 |
| 6,469,719 | B1 | | 10/2002 | Kino et al. |
| 6,549,219 | B2 | | 4/2003 | Selker |
| 6,583,798 | B1 | * | 6/2003 | Hoek et al. ..................... 715/822 |
| 6,661,437 | B1 | | 12/2003 | Miller et al. |
| 6,836,723 | B2 | * | 12/2004 | de Silva ......................... 701/200 |
| 6,877,138 | B2 | * | 4/2005 | Fitzpatrick et al. ........... 715/769 |
| 7,036,090 | B1 | | 4/2006 | Nguyen |
| 7,317,449 | B2 | * | 1/2008 | Robbins et al. ................ 345/169 |
| 7,369,102 | B2 | * | 5/2008 | Luke et al. ......................... 345/9 |
| 7,512,898 | B2 | | 3/2009 | Jennings et al. |
| 7,600,194 | B2 | | 10/2009 | DeMaio et al. |
| 7,600,197 | B2 | | 10/2009 | Gourdol et al. |
| 7,823,081 | B2 | | 10/2010 | Sato |
| 7,930,650 | B2 | | 4/2011 | Brodersen et al. |
| 7,966,575 | B1 | | 6/2011 | Jetha et al. |
| 8,136,045 | B2 | | 3/2012 | Miura et al. |
| 8,255,060 | B2 | | 8/2012 | Goetz et al. |
| 8,321,808 | B2 | | 11/2012 | Goetz et al. |
| 8,347,226 | B2 | | 1/2013 | Windl |
| 8,365,230 | B2 | | 1/2013 | Chane et al. |
| 8,527,896 | B2 | | 9/2013 | Matthews et al. |
| 8,589,812 | B2 | | 11/2013 | Pasquale et al. |
| 8,606,516 | B2 | | 12/2013 | Vertelney et al. |
| 2004/0183819 | A1 | * | 9/2004 | Henry ............................ 345/660 |

(Continued)

*Primary Examiner* — Patrick Riegler
(74) *Attorney, Agent, or Firm* — Fish & Richardson P.C.

(57) ABSTRACT

A computer-implemented user interface method includes displaying one or more display elements in a graphical user interface, including elements that correspond to pop up controls, receiving a selection of one of the one or more display elements, determining whether the selected element corresponds to a pop up control, and displaying the selected element in a highlighted format upon receiving the selection if the element corresponds to a pop up control, and displaying a pop up control after displaying the element in a highlighted format if the selection persists for a long press period.

19 Claims, 12 Drawing Sheets

(56) References Cited

U.S. PATENT DOCUMENTS

| | | | |
|---|---|---|---|
| 2004/0204970 A1* | 10/2004 | Boden et al. | 705/7 |
| 2004/0217947 A1* | 11/2004 | Fitzmaurice et al. | 345/183 |
| 2006/0020904 A1* | 1/2006 | Aaltonen et al. | 715/850 |
| 2006/0031010 A1* | 2/2006 | Friedrich | 701/211 |
| 2006/0062382 A1* | 3/2006 | Ronkainen | 379/433.06 |
| 2006/0112350 A1* | 5/2006 | Kato | 715/781 |
| 2006/0267966 A1* | 11/2006 | Grossman et al. | 345/179 |
| 2007/0022378 A1* | 1/2007 | Hamada | 715/716 |
| 2007/0139386 A1* | 6/2007 | Martin et al. | 345/173 |
| 2007/0162937 A1* | 7/2007 | Casement et al. | 725/58 |
| 2008/0040678 A1* | 2/2008 | Crump | 715/763 |
| 2008/0066610 A1* | 3/2008 | Chu et al. | 84/609 |
| 2008/0092081 A1* | 4/2008 | Jong et al. | 715/840 |
| 2008/0109751 A1* | 5/2008 | Fitzmaurice et al. | 715/793 |
| 2008/0163053 A1* | 7/2008 | Hwang et al. | 715/702 |
| 2008/0176604 A1* | 7/2008 | Kim | 455/566 |
| 2008/0263022 A1* | 10/2008 | Kostorizos et al. | 707/5 |
| 2009/0083665 A1* | 3/2009 | Anttila et al. | 715/834 |
| 2009/0187846 A1* | 7/2009 | Paasovaara | 715/780 |
| 2010/0214235 A1* | 8/2010 | Shmaya et al. | 345/173 |

\* cited by examiner

LONG PRESS INTERFACE INTERACTIONS

CROSS-REFERENCE TO RELATED APPLICATIONS

This application claims priority under 35 U.S.C. §119(e) to U.S. Provisional Application No. 61/027,386, filed Feb. 8, 2008 which is incorporated by reference in entirety hereto.

TECHNICAL FIELD

This document relates to systems and techniques for generating graphical display elements and controls.

BACKGROUND

People spend hours at a time with their electronic devices—computers, telephones, music players, and the like. They like best those devices that are intuitive to use and whose interactions best meet their expectations regarding how machines should work. They interact with electronics through inputs and outputs from the devices, where the outputs generally are provided audibly and/or on a flat graphical display screen, and the inputs may occur via touch screens, joysticks, mice, 4-directional keypads, and other such input mechanisms.

Fine distinctions in user interfaces can make a world of difference in a user's experience with a device. User interface options may be reduced for mobile devices, where full-sized keyboards or no keyboards at all are available. In such situations, intuitive interaction may be at a premium. The importance of such interaction may be even more pronounced with mobile devices, where the user needs to interact with a device using a single hand.

SUMMARY

This document describes systems and techniques that may be used to interact with a user of a computing device like a mobile telephone having a touch screen user interface. In general, the techniques may react in particular ways to a long press of an input mechanism such as a touch screen display or a clickable trackball. A long press is a selection that is maintained by a user for a time that is noticeably longer than a simple single press or click selection, and that, in appropriate circumstances, produces an interaction with the user that differs from that of a corresponding simple, or short, press or click.

In certain situations, it may be helpful to signal to a user when a particular selectable element that is part of a user interface is an element that will exhibit such long press activity. For example, a user may not be willing to read a user's manual or otherwise wander about a system trying to determine which elements exhibit long press behavior—finding some that respond and some that do not. To help a user may more readily understand the operation of a device, the techniques discussed here highlight an element that exhibits long press behavior, when it is first selected. In this manner, a user may quickly see that the element has additional functionality.

After the element has been selected for a long press period, the additional functionality is revealed—generally by a pop up control that a user may then interact with, and that is directed to the current context of the display. For example, the long press behavior may be activity that produces a pop up contextual menu that relates to an element in the display. As one example, a display may show a list of messages, such as voice mail, text, and e-mail messages, and long pressing on an element representing one message in the list of messages may cause a contextual menu to pop up that itself contains elements for handling the messages (e.g., reply, reply to all, forward, delete, etc.).

In certain implementations, such systems and technique may provide one or more advantages. For example, as mentioned above, a user of a device that displays, almost immediately upon a selection of an on-screen control, that the control exhibits long press behavior, may permit a person to have a quick and intuitive understanding of actions they can take with the control. Without the fast feedback, the user would not know about the additional capabilities of the element until the actual contextual menu or other item was displayed, and the user would then need to remove the displayed item before continuing.

In one implementation, a computer-implemented user interface method is disclosed. The method comprises displaying one or more display elements in a graphical user interface, including elements that correspond to pop up controls, receiving a selection of one of the one or more display elements, determining whether the selected element corresponds to a pop up control, and displaying the selected element in a highlighted format upon receiving the selection if the element corresponds to a pop up control, and displaying a pop up control after displaying the element in a highlighted format if the selection persists for a long press period. The pop up control can comprise a contextual menu. Also, the display element may be displayed in a highlighted format that comprises: (1) changing a color of one or more features of the display element; (2) thickening one or more features of the display element; and/or (3) increasing the size of the display element.

In certain aspects, the one or more display elements comprise selectable textual elements in a displayed list. Also, the selection can be received by a touch screen or selectable track ball.

In another implementation, computer-implemented user interface method is disclosed that comprises displaying a zoomable feature in a graphical user interface, receiving a selection on the zoomable feature, determining whether the selection is a long press selection, and if the selection is a long press selection, displaying a zooming control on the graphical user interface, and redisplaying the zoomable feature in response to user interaction with the zooming control. The zoomable feature can comprise a geographic map. Also, the zooming control can comprise a graphical slider that is responsive to user inputs, and the control can not be visible on the graphical user interface.

In certain aspects, redisplaying the zoomable feature comprises zooming the feature according to user interaction with the zooming control, and panning the feature according to user interaction with a second control. Also, the second control can be located outside the graphical user interface. In some aspects, the zooming control comprises a graphical slider and the second control comprises finger dragging on the zoomable feature. Moreover, redisplaying the zoomable feature can comprise centering the graphical user interface on a location of the zoomable feature corresponding to the location of the selection.

In yet another implementation, an article comprising a computer-readable data storage medium storing program code operable to cause one or more machines to perform operations is disclosed. Such operations can include displaying one or more display elements in a graphical user interface, including elements that correspond to pop up controls, receiving a selection of one of the one or more display elements, determining whether the selected element corresponds to a pop up control, and displaying the selected element in a highlighted format upon receiving the selection if the element corresponds to a pop up control, and displaying a pop up control after displaying the element in a highlighted format if the selection persists for a long press period. The pop up control can comprise a contextual menu, and displaying the display element in a highlighted format can comprise changing a color of one or more features of the display element.

In some aspects, displaying the display element in a highlighted format comprises thickening one or more features of the display element; and/or increasing the size of the display element. Also, the one or more display elements can comprise selectable textual elements in a displayed list.

In different implementation, another article having a computer-readable data storage medium is disclosed. The operations performed by code on the article includes displaying a zoomable feature in a graphical user interface, receiving a selection on the zoomable feature, determining whether the selection is a long press selection, and if the selection is a long press selection, displaying a zooming control on the graphical user interface, and redisplaying the zoomable feature in response to user interaction with the zooming control.

In another implementation, a computer-implemented user interface system is disclosed. The system comprises a graphical user interface module to display user selectable elements, including elements that correspond to pop up controls, a user input mechanism to receive user selections in coordination with the display of user selectable elements, and a long touch interface processor to determine when a user selection is a selection of an element that corresponds to a pop up control, to cause the element to be highlighted upon its selection, and to cause the pop up control to be displayed after a long touch period. The pop up control can comprise a contextual menu. The system may also comprise a mapping application, wherein the pop up control comprises a zoom control for the mapping application. In addition, the long touch processor can be programmed to cause the element to be highlighted by thickening one or more features of the display element. Also, the user input mechanism can comprise a touch screen or trackball.

Another disclosed computer-implemented user interface system includes a graphical user interface module to display user selectable zoomable content, a user input mechanism to receive user selections in coordination with the user selectable zoomable content, and a long touch interface processor to determine when a user selection is a long press selection, to display a zooming control on the graphical interface in response to the long press selection, and to cause a redisplay of the zoomable content in response to user interaction with the coming control. The system can also comprise a mapping application, and the pop up control can comprise a zoom control for the mapping application. Also, the zooming control can comprise a graphical slider that is responsive to user inputs. In some aspects, the zooming control receives input on the graphical user interface but is not visible on the graphical user interface. In yet other aspects, redisplaying the zoomable feature comprises zooming the feature according to user interaction with the zooming control, and panning the feature occurs according to user interaction with a second control.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques by which mobile devices may interact with a user of such devices. For example, a user may be able to select items that are part of a graphical user interface in a manner that quickly provides the user with information about the selected item. As one example, certain on-screen elements may have particular, hidden functionality, such as the ability to raise a context-sensitive menu associated with the elements. Such elements may react nearly immediately when pressed, whereas elements that do not have associated menus may react differently or not at all when first pressed, so that a user can understand that he or she has selected an element having such additional functionality immediately (or nearly immediately) upon selecting the element, but before the additional functionality presents itself.

The additional activity associated with some elements may be the ability to generate additional graphics elements when selected, using, for example, a long press selection technique. In one example, controls for a mapping application may be generated when a user long presses on a displayed map. Such controls may include a zoom control, which may be a traditional zoom slider control that is graphically displayed after a long press on a map. Other similar zooming techniques are also discussed here.

Figure 1:
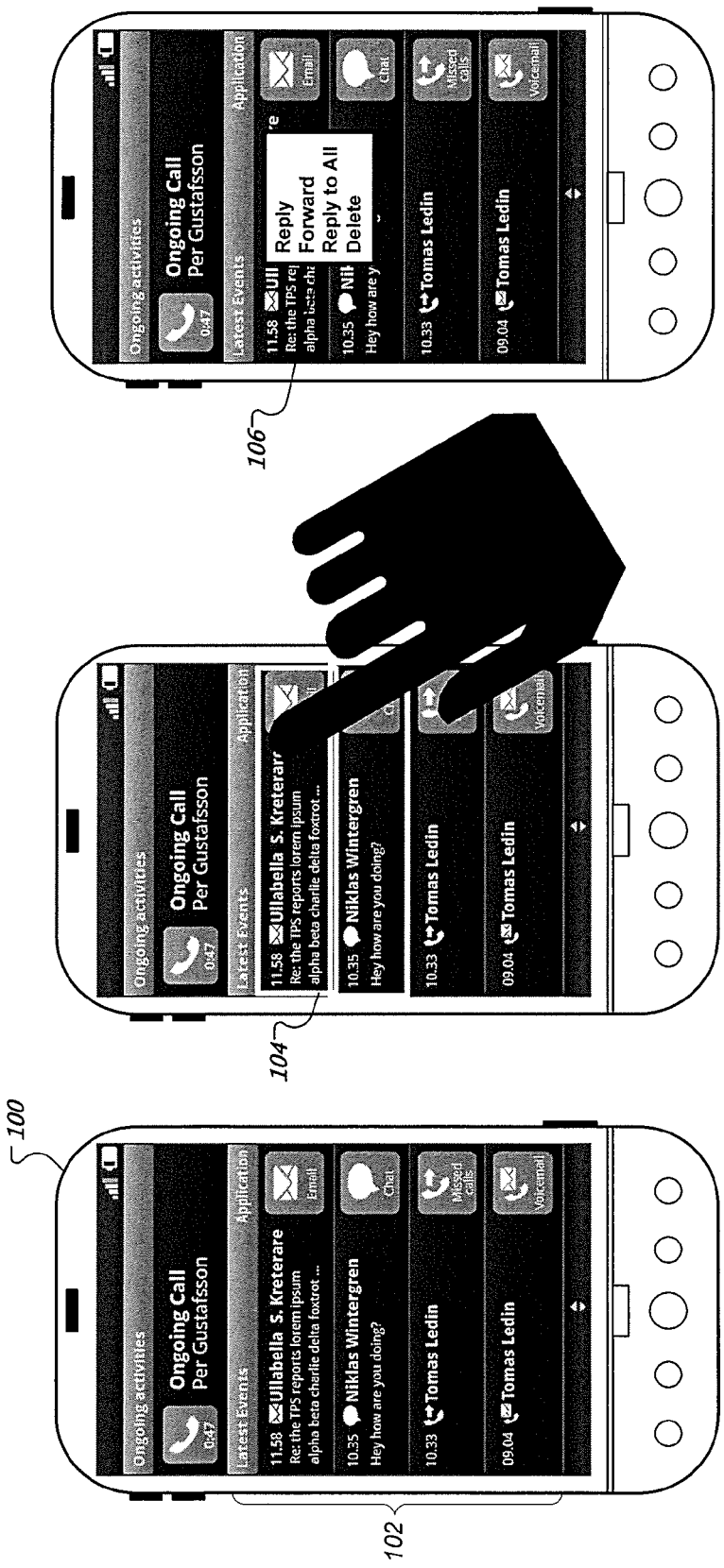
FIG. 1 shows several displays by a mobile device that exhibits long press behavior.

FIG. 1 shows several displays by a mobile device 100 that exhibits long press behavior. In this example, the device 100 is currently carrying a telephone conversation, as indicated by the "ongoing call" indication in the "ongoing activities" area of the user interface display. Separately, a number of interface elements showing recent messaging activities is also displayed. For example, while the user was previously using the device 100 for other things or not using the device at all, various messages may have arrived at the device. Such messages may have been indicated to the user initially by scrolling information from the messages across the status bar shown at the top of the display, and may then have been indicated by icons (e.g., small envelopes or telephones) in an empty area of the status bar (e.g., the left edge of the status bar in the figure) to alert the user to the fact that new messages had arrived.

The user may then have dragged his or her finger down from the status bar, and across the display, or selected a particular button or other form of control, to pull more details about each of the recent events onto the display, and to move any prior information about ongoing applications out of the way and to the ongoing activities area. In such a manner, the user may have generated the display shown here.

The latest events area 102 shows such recently-received message information (and may show information about non-message related events). In this example, the latest events area 102 lists four events sorted in reverse chronological order—an e-mail, a chat message, a notice about a missed call, and a voice mail.

A user selection (e.g., by pressing on a touch screen interface) of any of the messages may open the selected message. A user selection of an application icon next to one of the messages may open the full application, such as with the associated message opened in the application. Such actions may occur upon an up press event on the item when the user selects the item quickly.

The second display of the device 100 in FIG. 1 shows an example that may occur when the user selects an item—here, item 104. Specifically, the item, because it has associated additional functionality that will be described in more detail below, may be made to change its appearance soon after being pressed by the user. Such a change in appearance is shown here, by way of example, using a white lit-up box around the selected item. The change in appearance may also occur in a number of different manners, such as by increasing the size of the item slightly, changing the brightness or color(s) of the item (e.g., to make it temporarily brighter), by making the item jiggle slightly (e.g., so as to make it appear that the additional functionality is about to explode out of the item, like a chick hatching from an egg), and by other such visual mechanisms. The device 100 may also be made to vibrate in such a situation to indicate that additional functionality is coming if the user holds the selection.

The third, and right-most, display shows the functionality generated by a long press by the user. In this example, the functionality involves the generation of a contextual pop up menu 106 associated with the first message in the latest events area 102 that was long-pressed by the user. The menu is contextual because its content depends on the thing that was long pressed—here, the context involves basic operations that can be performed on the e-mail message that was selected (e.g., reply, forward, etc.). If a different event were selected, the contextual menu might have different values (e.g., it may not be possible to forward a missed telephone call).

The user may then select an item on the contextual pop up menu 106 in a familiar manner. For example, the user can select the "reply" item on the menu 106, and a copy of the e-mail, addressed to the original sender, may be instantiated, so that the user may add some text to the message and send it back.

It is also possible that certain items, such as a notification of a missed call, would have so few actions associated with them that a contextual menu would be overkill. In such a situation, a user selection of those items would not result in a white box being drawn around the item as the selection continues, as was shown in the middle display in FIG. 1. Rather, the display of the item might remain static, to indicate to the user that there is nothing additional to be gleaned from holding, or pressing, the item for a long time.

Thus, by these mechanisms, a user of a mobile device may navigate more quickly and seamlessly through the applications on their mobile device. They may quickly see if a selection is associated with further information that will be displayed after a long press, but without having to wait for the long press period. As a result, when they are first learning a new system, they will not need to move slowly around, holding down on items for long periods of time just to determine whether they exhibit long press behaviors. Also, after the user has had the device for a time, they will become trained to recognize immediate visual changes in items they select, and will know to expect a contextual menu or other such long press activity from the appearance of such initial activity. As a result, the presentation of such quick feedback to the user may make the graphical user interface of a device much more intuitive and easier to use.

Figure 2A:
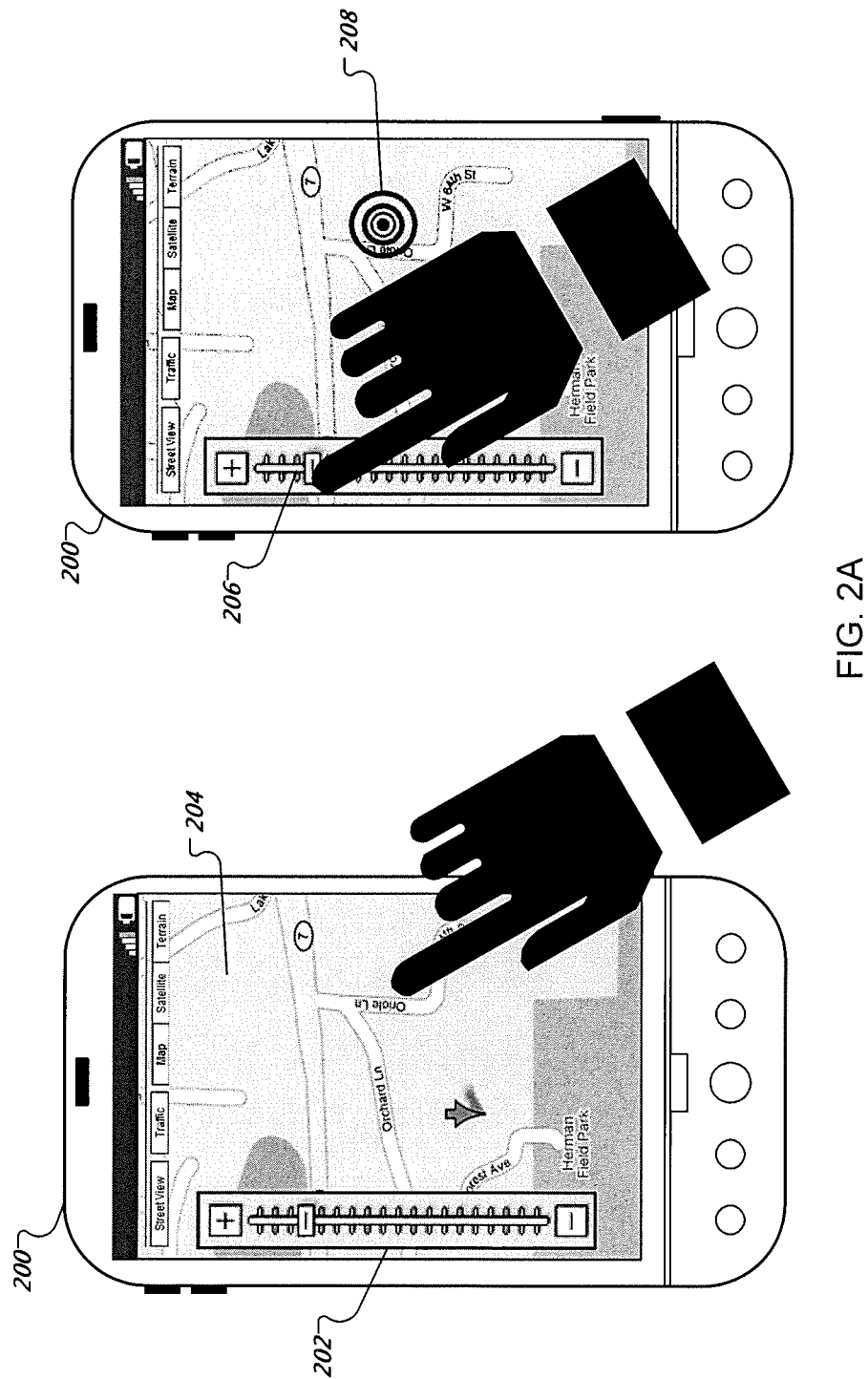
FIGS. 2A-2B show various displays exhibiting different interface mechanisms for performing a zoom function on a mobile device having a touch screen.
Figure 2B:
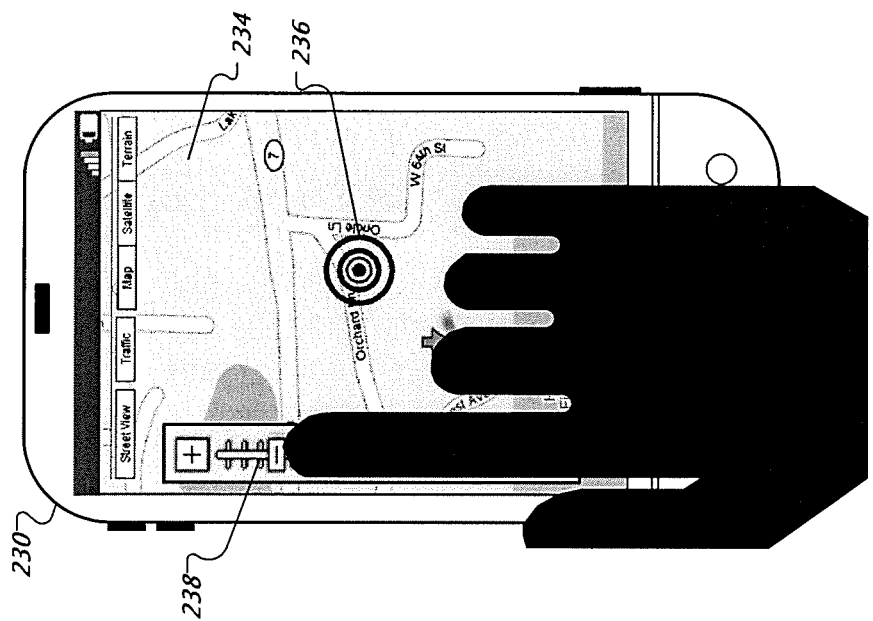
Figure 2B:
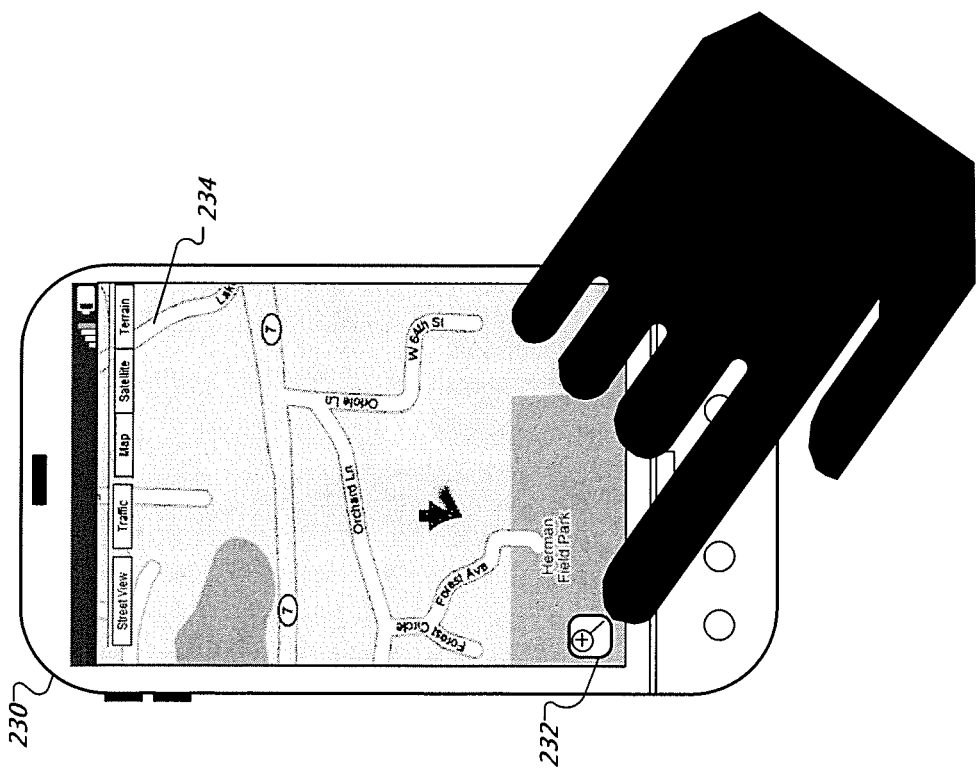

FIGS. 2A-2B show various displays exhibiting different interface mechanisms for performing a zoom function on a mobile device having a touch screen. Referring to FIG. 2A specifically, two displays are shown of the same mobile device 200, at two different points in time. An initial display shows a map tool for an application such as GOOGLE MAPS, with a user selecting a location on the map by pressing with their finger. Typically, such a selection may be conducted in a number of different ways. For example, the user may press and slide their finger across the display to pan in the map and see nearby areas on the map. Alternatively, the user could press twice quickly in succession, to zoom the map in. The user could press the map three times in succession to zoom the map out.

In this example, the user has selected a spot on the map and continued pressing for a long press period of time, such as by leaving their finger on the map for more than several hundred milliseconds. Such a long press period, however, may vary. For example, a user may selecting how long they would like their long press period to be on a global basis for any operations in a particular operating system—much like the ability of users to select how fast a double-click will operate with a computer mouse. In any event, the long press period is substantially longer than is required for a basic clicking selection operation like those just discussed. Also, the long press may be achieved through other mechanisms, such as by pressing down on a clickable trackball 205.

In the illustrated image, the user has already provided a long press selection, which has resulted in the generation of a zoom control 202 over the map 204. Such a selection may have initially (before the long press period had run) provided an indication that such a selection would result in the provision of additional functionality. For example, the zoom control 202 may have initially been displayed in a "ghost" or outline form until the long press period was met.

The second display, on the right, shows subsequent manipulation of the zoom control 202, via a slider 206 on the control 202. The manipulation is by a familiar technique (e.g., as used with GOOGLE MAPS) of dragging the slider upward toward a "+" sign to zoom in, and downward toward a "−" sign to zoom out.

A zoom center point 208 is shown schematically over the display to illustrate where the display will zoom into. This center point 208 is set in the example to be the location at which the user previously long-pressed. (The graphic shown here to represent the zoom center point 208 need not be displayed on the device 200.)

In this manner, a user can select a point of interest easily on a map and then can have the map zoom in on that point of interest automatically. Additional interaction may be provided after the zooming. For example, the user may place a finger on the display and drag it in a circular motion to rotate the map, much like they would to spin a piece of paper (e.g., a real map) on a flat surface such as a desk or table. Such an operation may also occur after the user has switched to a different view of a location, such as a street view, satellite view, or airplane view (e.g., an aerial view of a geography taken at a slight angle so that buildings can be rotated around by the viewer).

FIG. 2B shows yet another zooming interaction with a mobile device 230. Here, two different displays on device 230 show operation of the device at two different points in time. In the first instance, the device 230 is displaying a map 234, and a user has anchored a zoom point just between Oriole Lane and Orchard Lane on the map 234. The user is in the process of pressing a zoom control 232. The zoom control 232 may be displayed whenever a map is displayed, or may be generated only after a user has selected a zoom point or at some other appropriate point.

The device 230 in the right display demonstrates what happens after the user selects the zoom control 232. In particular, another zoom control having a slider control 238 has been displayed, and the user is beginning to manipulate the slider control 238 to cause zooming of the map 234. A zoom point 236 shows the point into which the zooming will occur. As just described, that point 236 may be a point that was selected by the user before they selected the zoom control 232. Alternatively, where the zoom control 232 is always displayed when a map is displayed, so that the user did not need to identify a zoom point, the zoom point may default to the center of the display or another appropriate point.

In the various implementations shown here, the zooming itself may be discrete or analog. Discrete zooming occurs by jumping from one zoom level to a separate zoom level, whereas analog zooming occurs by zooming smoothly along a continuum. Discrete zooming may be used, in particular, where a map is generated using tiles that have been previously generated to show a geography at particular zoom levels, so that zooming in or out causes a new set of tiles (at a closer zoom level) to replace a prior set of tiles. Certain zoom levels might simply show the initial tiles in a larger manner, whereas new tiles may be substituted when the level of zoom is such that the initial tiles cannot provide the needed detail. Thus, for example, the tiles may be replaced only at every third discrete level, or the like.

Figure 3:
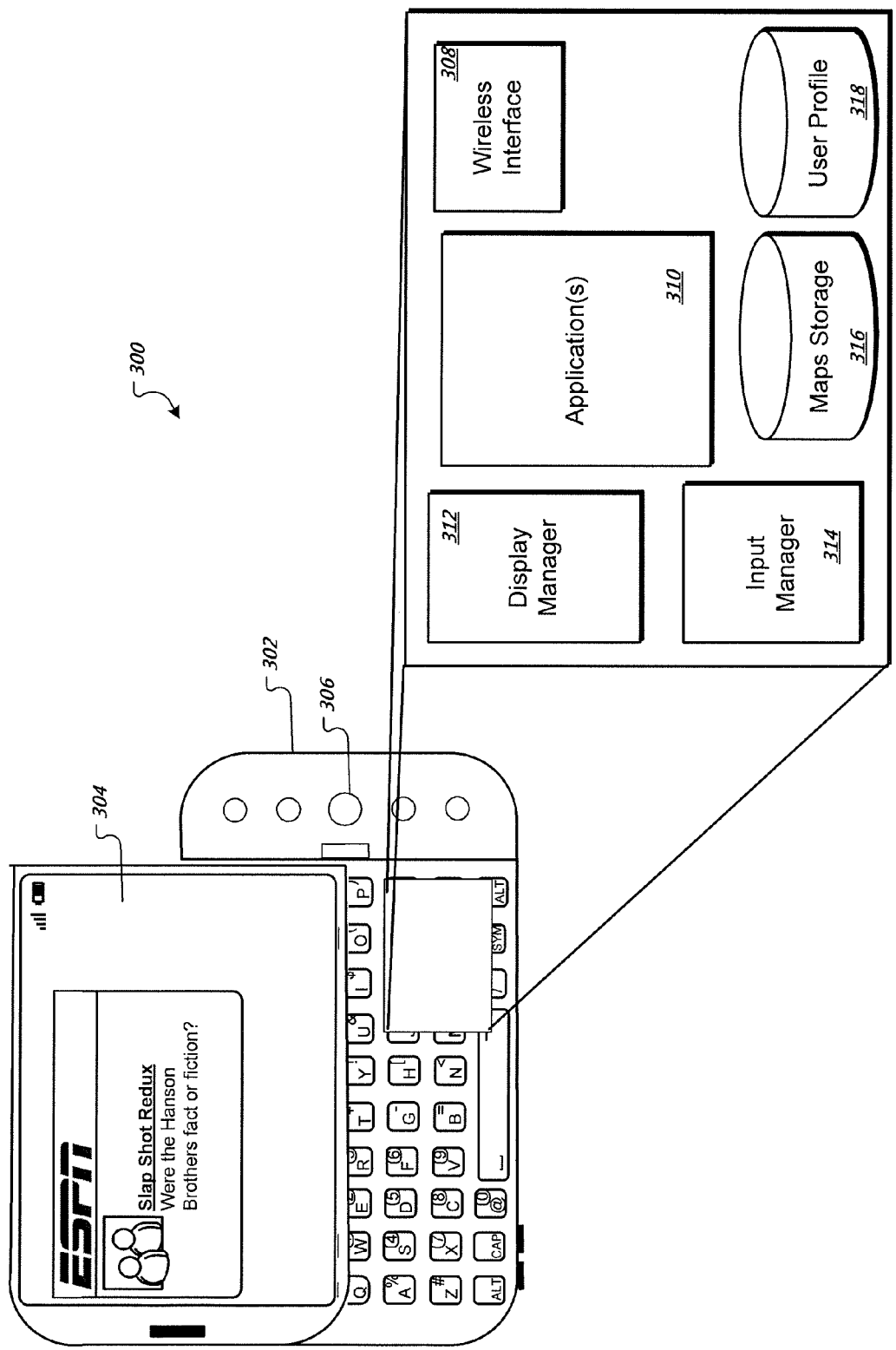
FIG. 3 is a schematic diagram of a system that provides user interaction in response to touch screen inputs.

FIG. 3 is a schematic diagram of a system 300 that provides user interaction in response to touch screen inputs. The system 300 may be implemented using a mobile device such as device 302. The device 302 includes various input and output mechanisms such as a touch screen display 304 and a roller ball 306. A number of components within device 302 may be configured to provide various selection functionality on display 304, such as the long touch functionality discussed above.

One such component is a display manager 312, which may be responsible for rendering content for presentation on display 304. The display manager 312 may receive graphic-related content from a number of sources and may determine how the content is to be provided to a user. For example, a number of different windows for various applications 310 on the device 302 may need to be displayed, and the display manager 312 may determine which to display, which to hide, and what to display or hide when there is overlap between various graphical objects.

An input manager 314 may be responsible for translating commands provided by a user of device 302. For example, such commands may come from a keyboard, from touch screen display 304, from trackball 306, or from other such sources, including dedicated buttons or soft buttons (e.g., buttons whose functions may change over time, and whose functions may be displayed on areas of display 304 that are adjacent to the particular buttons). The input manager 314 may determine, for example, in what area of the display commands are being received, and thus in what application being shown on the display the commands are intended. In addition, it may interpret input motions on the touch screen 304 into a common format and pass those interpreted motions (e.g., short press, long press, multiple press, and straight-line drags, and other motions) to the appropriate application. The input manager 314 may also report such inputs to an event manager (not shown) that in turn reports them to the appropriate modules or applications.

A variety of applications 310 may operate, generally on a common microprocessor, on the device 302. The applications 310 may take a variety of forms, such as mapping applications, e-mail and other messaging applications, web browser applications, and various applications running within a web browser or running extensions of a web browser.

A wireless interface 308 manages communication with a wireless network, which may be a data network that also carries voice communications. The wireless interface may operate in a familiar manner, such as according to the examples discussed below, and may provide for communication by the device 302 with messaging services such as text messaging, e-mail, and telephone voice mail messaging services. In addition, the wireless interface 308 may support downloads and uploads of content and computer code over a wireless network.

Various forms of persistent storage may be provided, such as using fixed disk drives and/or solid state memory devices. Two examples are shown here. First, maps storage 316 includes data representing one or more geographic maps that may be displayed on device 302. The maps storage 316 may include a limited number of maps, such as a single map, in memory shared with many other components of the system 300 where the device 302 uses a web browser or similar system to access on-line maps. Alternatively, a number of maps for an entire geographic area may be loaded into map storage 316 and used by device 302 to reduce the need to download map content while the device 302 is being used. Such map content may be manipulated in manners like those discussed above.

Other storage includes a user profile 318, which may be stored on the same media as maps storage 316. The user profile 318 includes various parameters about a user of the device 302. In the example relevant here, the user profile may include data defining the length of a long press period for the user, among other things, such as the speed for a double press by the user, the speed with which trackball 306 movements are to result in on-screen movements of a pointer, particular actions that are to be achieved by multi-touch input, and other such factors.

Using the pictured components, and others that are omitted here for clarity, the device 302 may provide particular actions in response to user inputs. Specifically, the device 302 may respond to long press inputs in particular ways, including by initially displaying a selected on-screen item in a highlighted manner upon a user selection of the item, but before the expiration of a long touch period. The device 302 may then display particular long touch activity after the long touch period has expired.

Figure 4A:
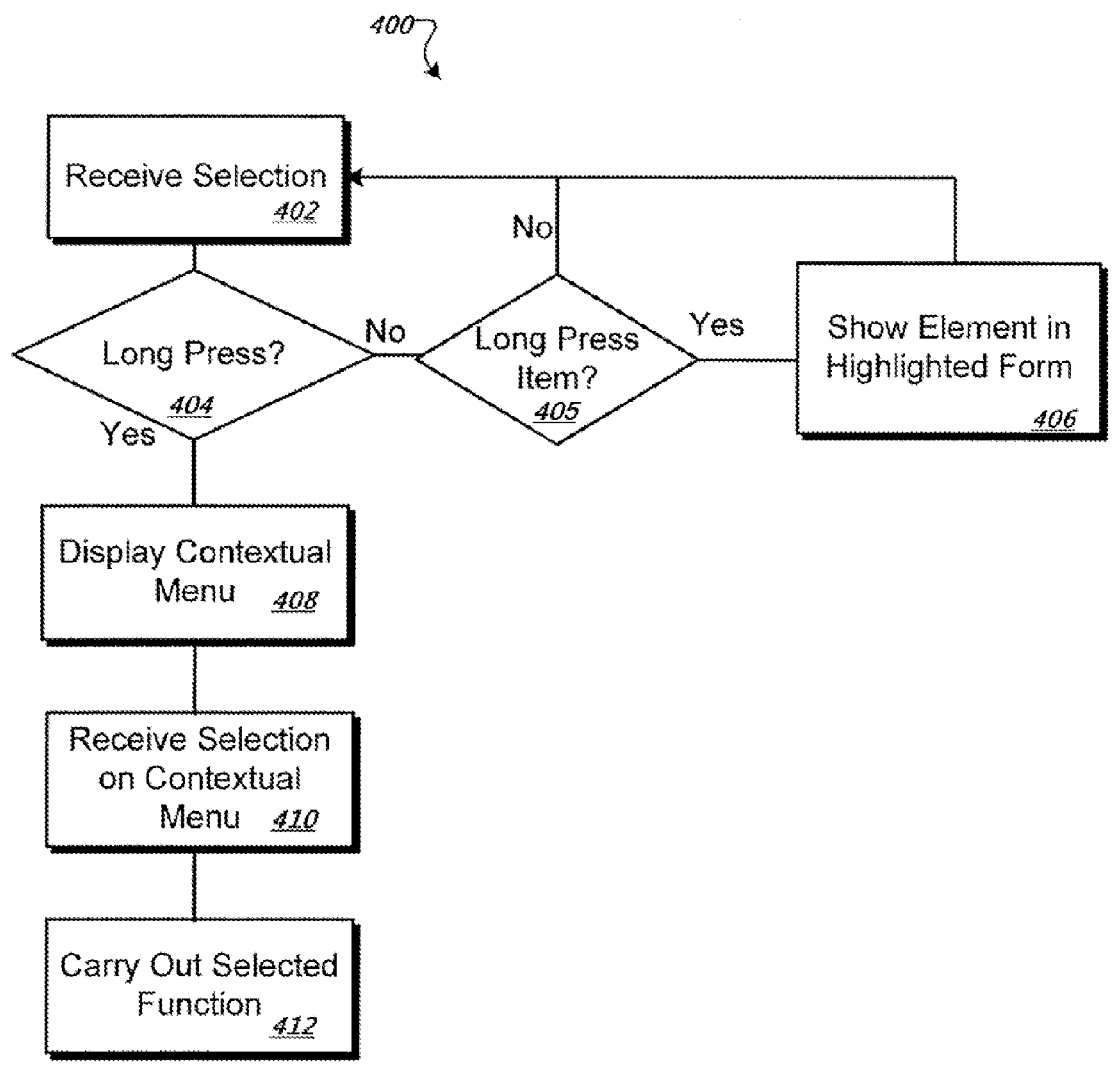
FIGS. 4A-4C are flow charts of example processes for receiving user selections from graphical user interface.
Figure 4B:
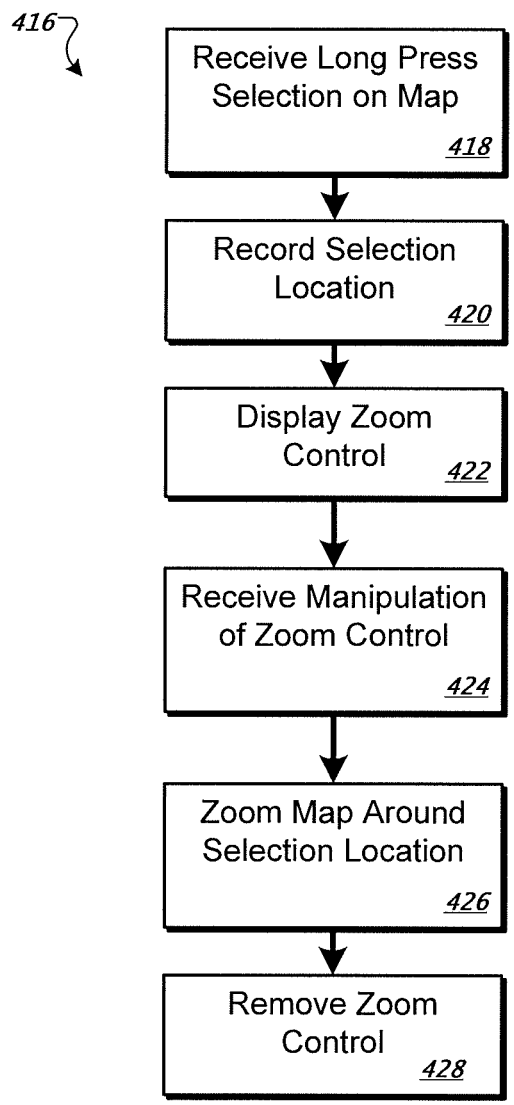
Figure 4C:
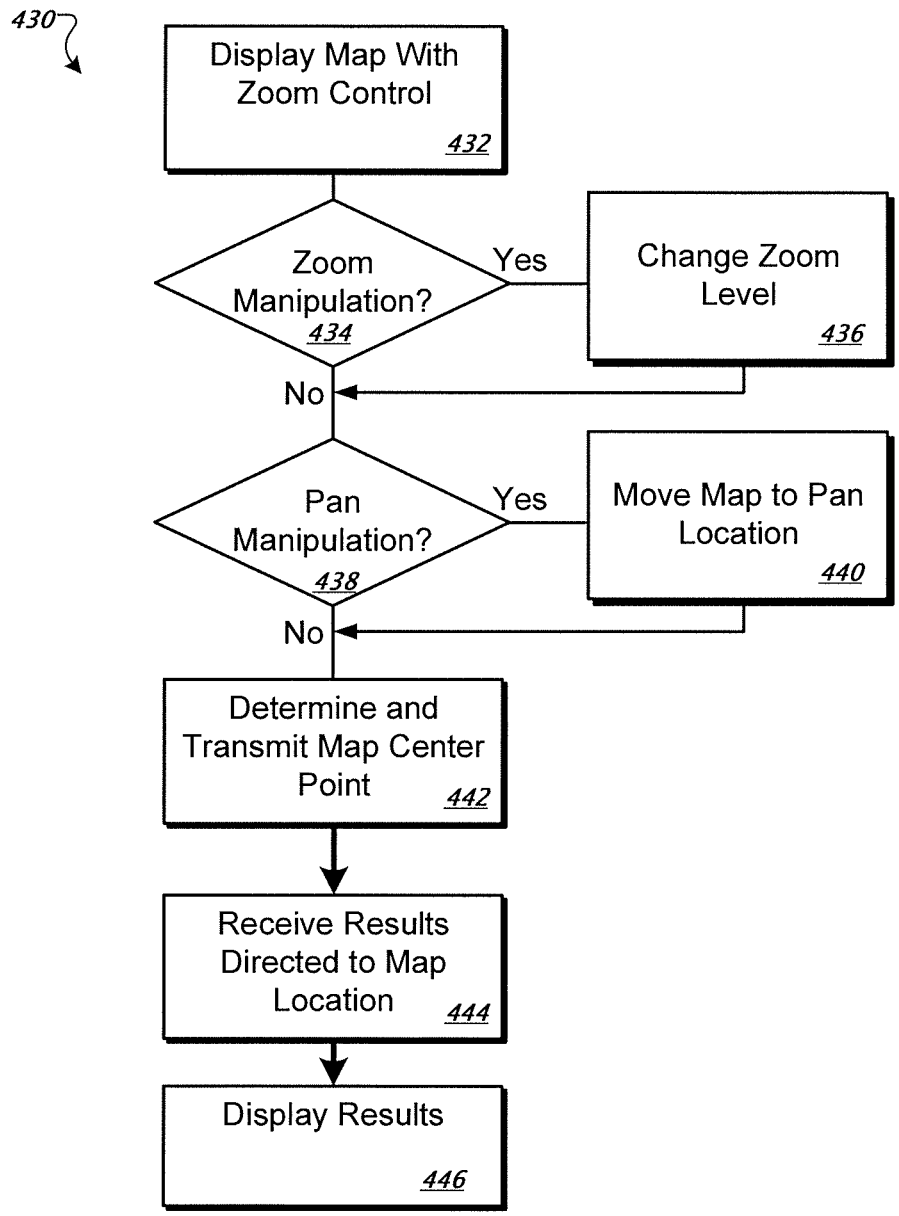

FIGS. 4A-4C are flow charts of example processes for receiving user selections from graphical user interface. FIG. 4A shows, for example, a process 400 by which a mobile device may respond to a long press selection. The example process 400 begins at box 402, where a selection is received on the mobile device. The selection may include, for example, a finger press (or stylus press) on a touch screen input device, or a pressing of a button or trackball on a device. At box 404, the process 400 determines whether sufficient time has expired for a long press period on the device. If such a time period has not yet expired, the process 400 determines whether the selected item exhibits long press functionality (box 405). If it does not, the process 400 simply continues waiting for an up press event. If the selected item does exhibit long press functionality, the selected item is shown in highlighted form on the display (box 406). As noted above, such highlighted display may include, for example, display with a differently-colored border, in different colors, in greater brightness or pulsating brightness, or in a jittering or slightly enlarged form. The particular highlighted form may change during the long press period, such as by the brightness of the item becoming progressively greater during the period, or the item becoming progressively larger.

Once the long press period has expired (box 404), the process 400 may cause a contextual menu to be displayed on the device. Such a menu may include a pop up menu that appears over or near the selected item or at the point where the selection occurred, for example (box 408). Other forms of contextual selections may also be provided. In a typical situation, the contextual menu will include selectable elements, and at box 410, a user provides a selection of one of the elements. In response to such a selection, the process 400 carries out the selected function at box 412, and the contextual menu may then disappear. The user may then continue operating the device in a typical fashion.

FIG. 4B shows an example process 416 by which a long press input may be handled by a mapping application. The process 416 starts at box 418, where a long press selection is received on a map generated by the mapping application. At box 420, the location of the long press is recorded, such as in relation to a particular point on a map. In appropriate circumstances, the long press selection may then cause a zoom control or other such control to be displayed (box 422). The user may then manipulate the zoom control, such as by leaving their initial finger in place and manipulating the control with another finger, or by lifting their finger and using it to manipulate the control (box 424).

At box 426, the process then zooms the map, in response to the user manipulation, around the location on the map at which the selection was recorded. For example, if the user initially selected a point in an upper right corner of a map with a long press, and then lifted their finger and used it to manipulate the zoom control, the application may zoom into the area of the map that was initially in the upper right corner of the display. At some point, the user may determine that they are done zooming and may wish to have the zoom control removed so that they can see more of the map. At such a point, the zoom control may be hidden so that the user needs to long press again to bring it back (box 428). A user indication of a desire to have the zoom control removed may occur, for example, by a sufficient delay in the user selecting the zoom control, or by the user providing a fast touch on the map without moving (where pressing and moving or dragging would indicate an intent to pan the map, and not to remove the zoom control).

FIG. 4C shows an example process 430 for responding to user manipulation of a mapping application on a mobile device. At box 432, a map is displayed along with a zoom control. The control may initially be displayed, or may be displayed in response to a user selection, such as a long press selection, as described above. At box 434, the process 430 determines that a zoom manipulation has been executed by the user, such as by selecting an area of the zoom control. If a zoom manipulation has occurred, then the process 430 may cause the zoom level of the map to be changed (box 436). If the input is instead, or in addition, determined to be a pan manipulation (box 438), the map may be moved to the pan location (box 440). Such manipulation may include, for example, a press followed quickly by a dragging motion on a map, which may cause the map to move along with the dragging motion.

Upon the completion of any movement action by the user, the map centerpoint and/or zoom level may be determined (box 442) so that the system can confirm what is currently being shown to the user. The centerpoint and zoom level may then be transmitted to a remote server as a local search query, which may be used to identify points of interest in the area in which the viewer is looking. For example, local restaurants in the area may wish to provide local-based advertising, and icons representing those restaurants may be retrieved and provided for display on the mobile device (boxes 444 and 446).

In these manners, convenient user manipulation of graphical elements in a GUI, such as for a mapping application or various messaging applications, may be provided. Where long press interaction is desired, users may be given near-immediate feedback regarding the long press interaction of an element in a very intuitive manner without having to wait for the long press behavior to exhibit itself, and then having to cancel out of the long press behavior if that is not what they wanted. Also, various additional graphical element interaction has been shown and described.

Figure 5:
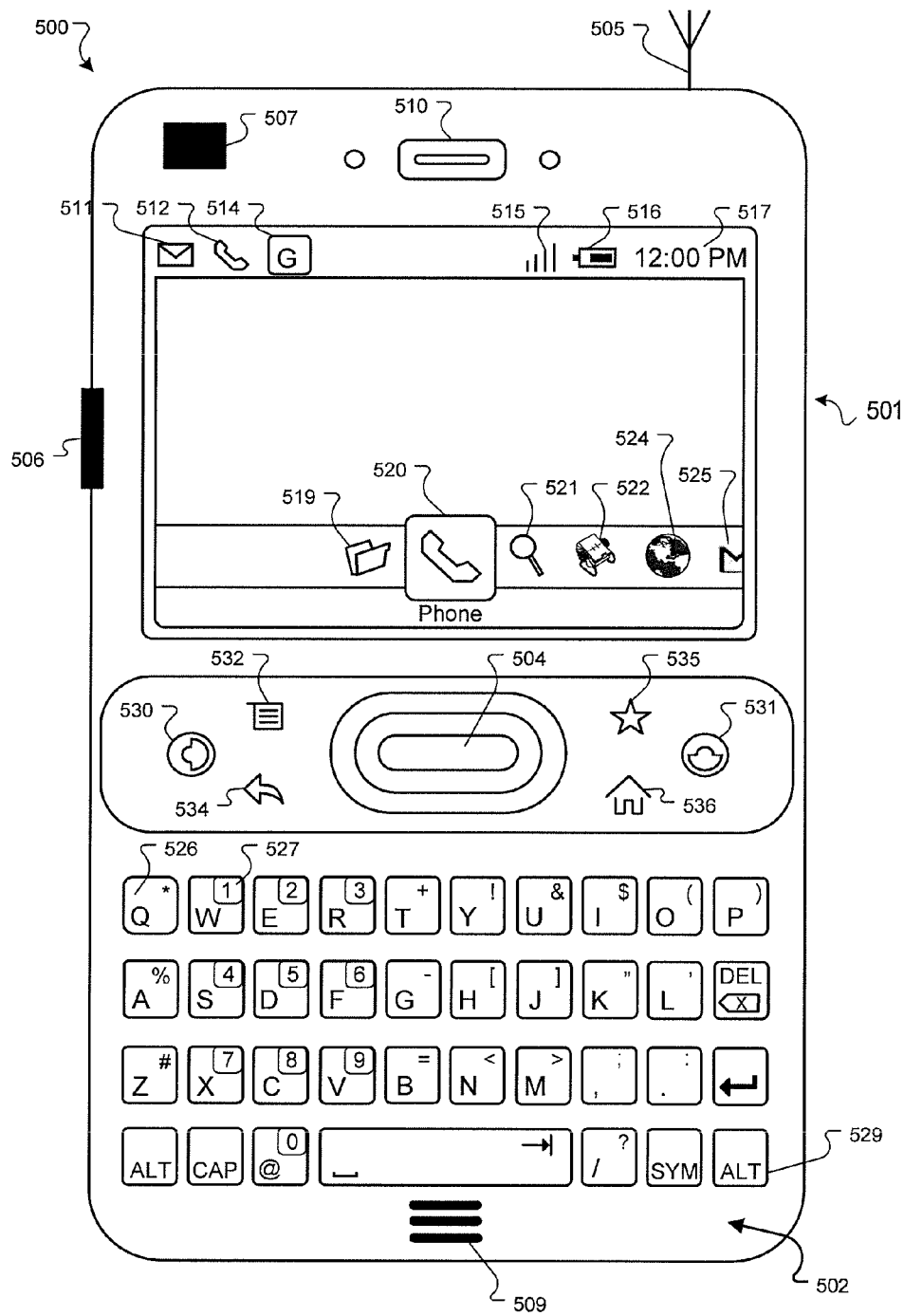
FIG. 5 is a schematic representation of an exemplary mobile device that implements embodiments of the notification techniques described herein.

Referring now to FIG. 5, the exterior appearance of an exemplary device 500 that implements the user interface features described here is illustrated. Briefly, and among other things, the device 500 includes a processor configured to display notifications regarding events on the device 500, and to permit a user to conveniently "pull down" detail about the events relating to the notifications into an extended view of the events.

In more detail, the hardware environment of the device 500 includes a display 501 for displaying text, images, and video to a user; a keyboard 502 for entering text data and user commands into the device 500; a pointing device 504 for pointing, selecting, and adjusting objects displayed on the display 501; an antenna 505; a network connection 506; a camera 507; a microphone 509; and a speaker 510. Although the device 500 shows an external antenna 505, the device 500 can include an internal antenna, which is not visible to the user.

The display 501 can display video, graphics, images, and text that make up the user interface for the software applications used by the device 500, and the operating system programs used to operate the device 500. Among the possible elements that may be displayed on the display 501 are a new mail indicator 511 that alerts a user to the presence of a new message; an active call indicator 512 that indicates that a telephone call is being received, placed, or is occurring; a data standard indicator 514 that indicates the data standard currently being used by the device 500 to transmit and receive data; a signal strength indicator 515 that indicates a measurement of the strength of a signal received by via the antenna 505, such as by using signal strength bars; a battery life indicator 516 that indicates a measurement of the remaining battery life; or a clock 517 that outputs the current time.

The display 501 may also show application icons representing various applications available to the user, such as a web browser application icon 519, a phone application icon 520, a search application icon 521, a contacts application icon 522, a mapping application icon 524, an email application icon 525, or other application icons. In one example implementation, the display 501 is a quarter video graphics array (QVGA) thin film transistor (TFT) liquid crystal display (LCD), capable of 16-bit or better color.

A user uses the keyboard (or "keypad") 502 to enter commands and data to operate and control the operating system and applications that provide for responding to notification of alerts and responding to messages and the like (and also to a touch screen). The keyboard 502 includes standard keyboard buttons or keys associated with alphanumeric characters, such as keys 526 and 527 that are associated with the alphanumeric characters "Q" and "W" when selected alone, or are associated with the characters "*" and "1" when pressed in combination with key 529. A single key may also be associated with special characters or functions, including unlabeled functions, based upon the state of the operating system or applications invoked by the operating system. For example, when an application calls for the input of a numeric character, a selection of the key 527 alone may cause a "1" to be input.

In addition to keys traditionally associated with an alphanumeric keypad, the keyboard 502 also includes other special function keys, such as an establish call key 530 that causes a received call to be answered or a new call to be originated; a terminate call key 531 that causes the termination of an active call; a drop down menu key 532 that causes a menu to appear within the display 501; a backward navigation key 534 that causes a previously accessed network address to be accessed again; a favorites key 535 that causes an active web page to be placed in a bookmarks folder of favorite sites, or causes a bookmarks folder to appear; a home page key 536 that causes an application invoked on the device 500 to navigate to a predetermined network address; or other keys that provide for multiple-way navigation, application selection, and power and volume control.

The user uses the pointing device 504 to select and adjust graphics and text objects displayed on the display 501 as part of the interaction with and control of the device 500 and the applications invoked on the device 500. The pointing device 504 is any appropriate type of pointing device, and may be a joystick, a trackball, a touch-pad, a camera, a voice input device, a touch screen device implemented in combination with the display 501, or any other input device.

The antenna 505, which can be an external antenna or an internal antenna, is a directional or omni-directional antenna used for the transmission and reception of radiofrequency (RF) signals that implement point-to-point radio communication, wireless local area network (LAN) communication, or location determination. The antenna 505 may facilitate point-to-point radio communication using the Specialized Mobile Radio (SMR), cellular, or Personal Communication Service (PCS) frequency bands, and may implement the transmission of data using any number or data standards. For example, the antenna 505 may allow data to be transmitted between the device 500 and a base station using technologies such as Wireless Broadband (WiBro), Worldwide Interoperability for Microwave ACCess (WiMAX), 5GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285 transceiver and PM7540power management circuit.

The wireless or wired computer network connection 506 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 506 may connect to a LAN network, a corporate or government WAN network, the Internet, a telephone network, or other network. The network connection 506 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 5.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 506 and the antenna 505 are integrated into a single component.

The camera 507 allows the device 500 to capture digital images, and may be a scanner, a digital still camera, a digital video camera, other digital input device. In one example implementation, the camera 507 is a 5 mega-pixel (MP) camera that utilizes a complementary metal-oxide semiconductor (CMOS).

The microphone 509 allows the device 500 to capture sound, and may be an omni-directional microphone, a unidirectional microphone, a bi-directional microphone, a shotgun microphone, or other type of apparatus that converts sound to an electrical signal. The microphone 509 may be used to capture sound generated by a user, for example when the user is speaking to another user during a telephone call via the device 500. Conversely, the speaker 510 allows the device to convert an electrical signal into sound, such as a voice from another user generated by a telephone application program, or a ring tone generated from a ring tone application program. Furthermore, although the device 500 is illustrated in FIG. 5 as a handheld device, in further implementations the device 500 may be a laptop, a workstation, a midrange computer, a mainframe, an embedded system, telephone, desktop PC, a tablet computer, a PDA, or other type of computing device.

Figure 6:
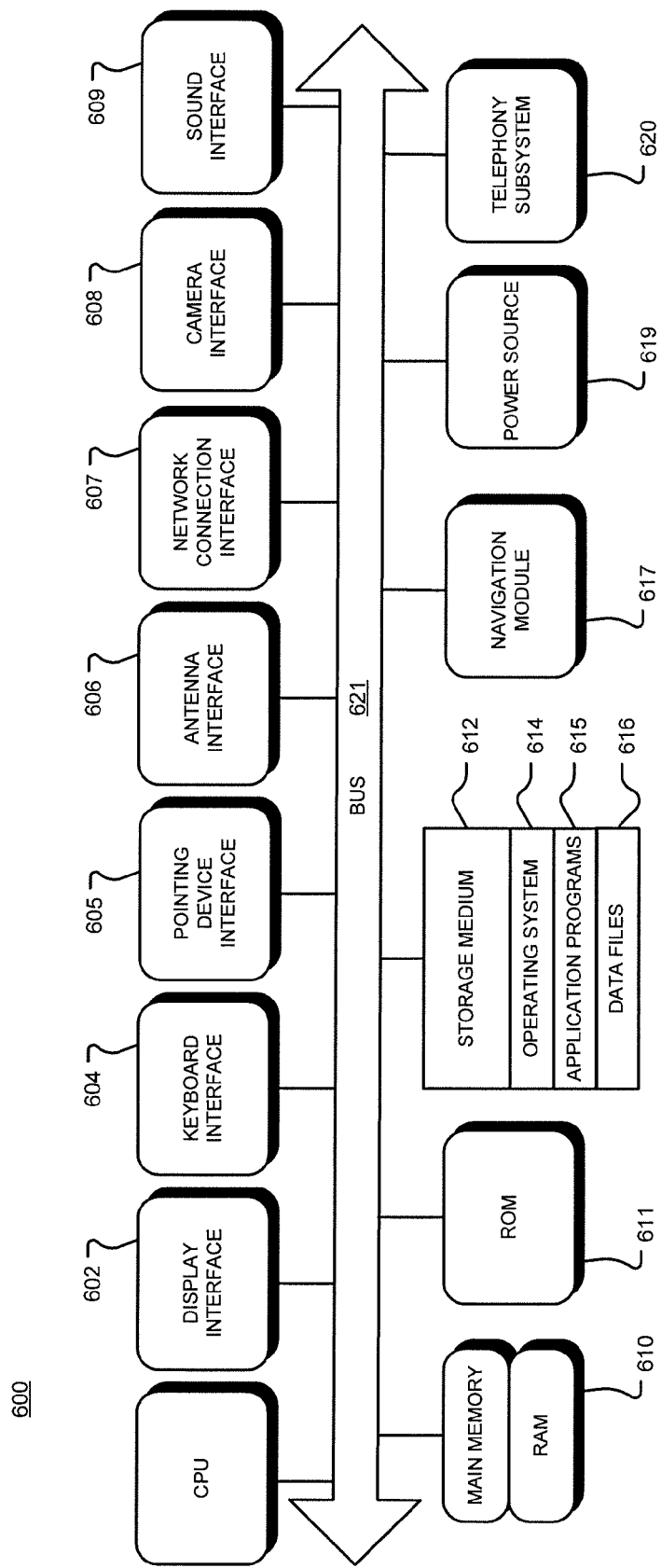
FIG. 6 is a block diagram illustrating the internal architecture of the device of FIG. 5.

FIG. 6 is a block diagram illustrating an internal architecture 600 of the device 500. The architecture includes a central processing unit (CPU) 601 where the computer instructions that comprise an operating system or an application are processed; a display interface 602 that provides a communication interface and processing functions for rendering video, graphics, images, and texts on the display 501, provides a set of built-in controls (such as buttons, text and lists), and supports diverse screen sizes; a keyboard interface 604 that provides a communication interface to the keyboard 502; a pointing device interface 605 that provides a communication interface to the pointing device 504; an antenna interface 606 that provides a communication interface to the antenna 505; a network connection interface 607 that provides a communication interface to a network over the computer network connection 506; a camera interface 608 that provides a communication interface and processing functions for capturing digital images from the camera 507; a sound interface 609 that provides a communication interface for converting sound into electrical signals using the microphone 509 and for converting electrical signals into sound using the speaker 510; a random access memory (RAM) 610 where computer instructions and data are stored in a volatile memory device for processing by the CPU 601; a read-only memory (ROM) 611 where invariant low-level systems code or data for basic system functions such as basic input and output (I/O), startup, or reception of keystrokes from the keyboard 502 are stored in a non-volatile memory device; a storage medium 612 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 614, application programs 615 (including, for example, a web browser application, a widget or gadget engine, and or other applications, as necessary) and data files 616 are stored; a navigation module 617 that provides a real-world or relative position or geographic location of the device 500; a power source 619 that provides an appropriate alternating current (AC) or direct current (DC) to power components; and a telephony subsystem 620 that allows the device 500 to transmit and receive sound over a telephone network. The constituent devices and the CPU 601 communicate with each other over a bus 621.

The CPU 601 can be one of a number of computer processors. In one arrangement, the computer CPU 601 is more than one processing unit. The RAM 610 interfaces with the computer bus 621 so as to provide quick RAM storage to the CPU 601 during the execution of software programs such as the operating system application programs, and device drivers. More specifically, the CPU 601 loads computer-executable process steps from the storage medium 612 or other media into a field of the RAM 610 in order to execute software programs. Data is stored in the RAM 610, where the data is accessed by the computer CPU 601 during execution. In one example configuration, the device 500 includes at least 128 MB of RAM, and 256 MB of flash memory.

The storage medium 612 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 500 to access computer-executable process steps, application programs and the like, stored on removable and non-removable memory media, to off-load data from the device 500, or to upload data onto the device 500.

A computer program product is tangibly embodied in storage medium 612, a machine-readable storage medium. The computer program product includes instructions that, when read by a machine, operate to cause a data processing apparatus to store image data in the mobile device. In some embodiments, the computer program product includes instructions that generate notifications about alerts such as newly arriving messages on the device.

The operating system 614 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 614 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON FLASH LITE, or MICROSOFT .NET Compact, or another appropriate environment.

The device stores computer-executable code for the operating system 614, and the application programs 615 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 615 may also include a widget or gadget engine, such as a TAFRI widget engine, a MICROSOFT gadget engine such as the WINDOWS SIDEBAR gadget engine or the KAPSULES gadget engine, a YAHOO! widget engine such as the KONFABULTOR widget engine, the APPLE DASHBOARD widget engine, the GOOGLE gadget engine, the KLIPFOLIO widget engine, an OPERA widget engine, the WIDSETS widget engine, a proprietary widget or gadget engine, or other widget or gadget engine the provides host system software for a physically-inspired applet on a desktop.

Although it is possible to provide for notifications and interactions with messages and other events using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 617 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 617 may also be used to measure angular displacement, orientation, or velocity of the device 500, such as by using one or more accelerometers.

Figure 7:
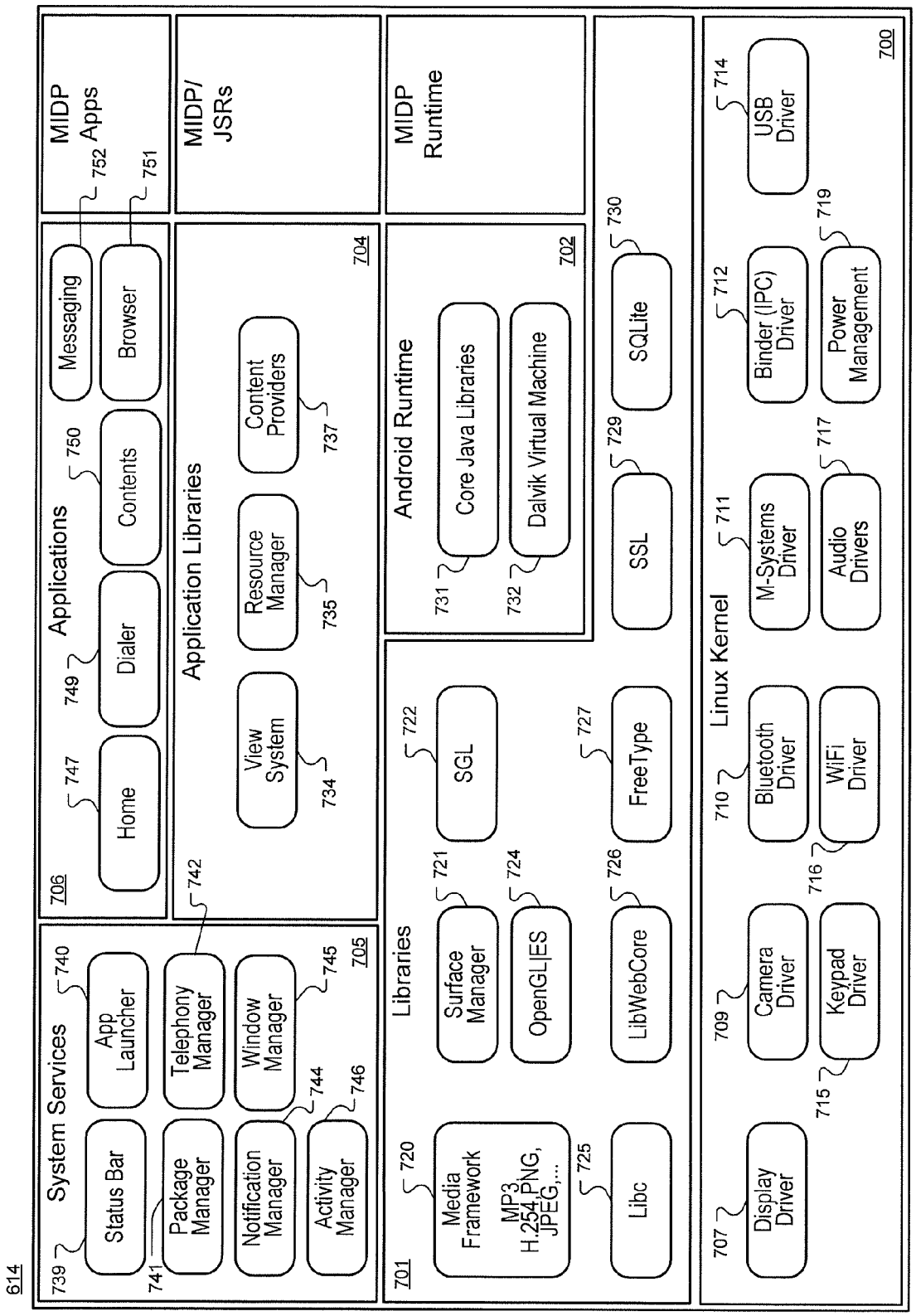
FIG. 7 is a block diagram illustrating exemplary components of the operating system used by the device of FIG. 5.

FIG. 7 is a block diagram illustrating exemplary components of the operating system 614 used by the device 500, in the case where the operating system 614 is the GOOGLE mobile device platform. The operating system 614 invokes multiple processes, while ensuring that the associated phone application is responsive, and that wayward applications do not cause a fault (or "crash") of the operating system. Using task switching, the operating system 614 allows for the switching of applications while on a telephone call, without losing the state of each associated application. The operating system 614 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 614 can generally be organized into six components: a kernel 700, libraries 701, an operating system runtime 702, application libraries 704, system services 705, and applications 706. The kernel 700 includes a display driver 707 that allows software such as the operating system 614 and the application programs 715 to interact with the display 501 via the display interface 602, a camera driver 709 that allows the software to interact with the camera 507; a BLUETOOTH driver 710; a M-Systems driver 711; a binder (IPC) driver 712, a USB driver 714 a keypad driver 715 that allows the software to interact with the keyboard 502 via the keyboard interface 604; a WiFi driver 716; audio drivers 717 that allow the software to interact with the microphone 509 and the speaker 510 via the sound interface 609; and a power management component 719 that allows the software to interact with and manage the power source 719.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 701 include a media framework 720 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 721; a simple graphics library (SGL) 722 for two-dimensional application drawing; an Open Graphics Library for Embedded Systems (OpenGL ES) 724 for gaming and three-dimensional rendering; a C standard library (LIBC) 725; a LIBWEBCORE library 726; a FreeType library 727; an SSL 729; and an SQLite library 730.

The operating system runtime 702 includes core JAVA libraries 731, and a Dalvik virtual machine 732. The Dalvik virtual machine 732 is a custom, virtual machine that runs a customized file format (.DEX).

The operating system 614 can also include Mobile Information Device Profile (MIDP) components such as the MIDP JAVA Specification Requests (JSRs) components, MIDP runtime, and MIDP applications as shown in FIG. 7. The MIDP components can support MIDP applications running on the device 500.

With regard to graphics rendering, a system-wide composer manages surfaces and a frame buffer and handles window transitions, using the OpenGL ES 724 and two-dimensional hardware accelerators for its compositions.

The Dalvik virtual machine 732 may be used with an embedded environment, since it uses runtime memory very efficiently, implements a CPU-optimized bytecode interpreter, and supports multiple virtual machine processes per device. The custom file format (DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated byte-codes are designed for quick interpretation, since register-based instead of stack-based instructions reduce memory and dispatch overhead, since using fixed width instructions simplifies parsing, and since the 16-bit code units minimize reads.

The application libraries 704 include a view system 734, a resource manager 735, and content providers 737. The system services 705 includes a status bar 739; an application launcher 740; a package manager 741 that maintains information for all installed applications; a telephony manager 742 that provides an application level JAVA interface to the telephony subsystem 620; a notification manager 744 that allows all applications access to the status bar and on-screen notifications; a window manager 745 that allows multiple applications with multiple windows to share the display 501; and an activity manager 746 that runs each application in a separate process, manages an application life cycle, and maintains a cross-application history.

The applications 706 include a home application 747, a dialer application 749, a contacts application 750, and a browser application 751. Each of the applications may generate graphical elements that either do or do not have long press interactions. As described above, those that do not have long press interactions may provide no immediate visual feedback when they are first pressed, while those that do have such interactions may be highlighted between the time they are first pressed and the expiration of the long press period. Also, the highlighting may not occur exactly upon a press, so that mere tapping of an item does not cause it to be highlighted; instead, the highlighting may occur upon the expiration of a short press period that is slightly more than the time period for a tap, but appreciably shorter than a long press period.

The telephony manager 742 provides event notifications (such as phone state, network state, Subscriber Identity Module (SIM) status, or voicemail status), allows access to state information (such as network information, SIM information, or voicemail presence), initiates calls, and queries and controls the call state. The browser application 751 renders web pages in a full, desktop-like manager, including navigation functions. Furthermore, the browser application 751 allows single column, small screen rendering, and provides for the embedding of HTML views into other applications.

Figure 8:
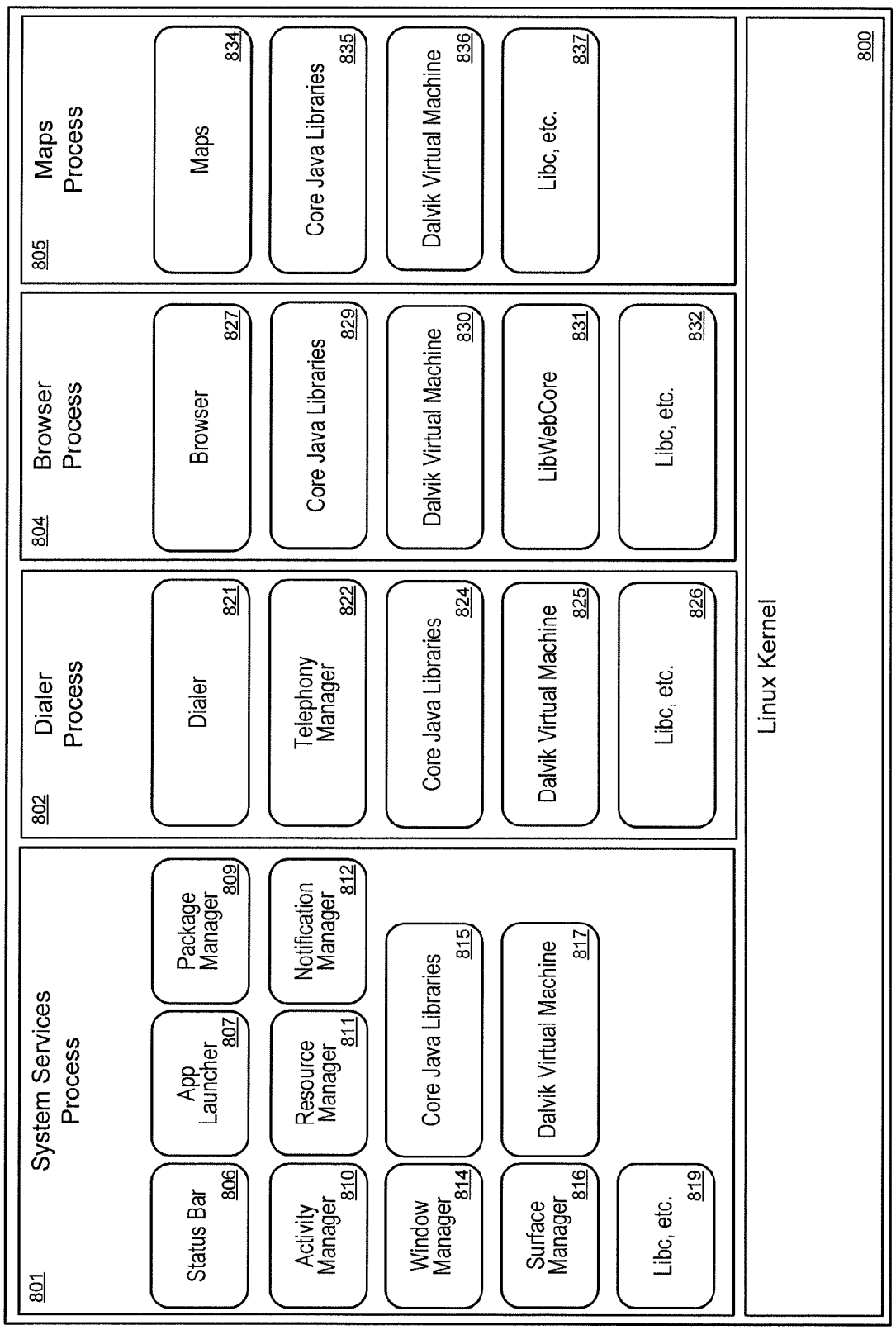
FIG. 8 is a block diagram illustrating exemplary processes implemented by the operating system kernel of FIG. 7.

FIG. 8 is a block diagram illustrating exemplary processes implemented by the operating system kernel 800. Generally, applications and system services run in separate processes, where the activity manager 746 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 816, the window manager 814, or the activity manager 810 can be continuously executed while the device 500 is powered. Additionally, some application-specific process can also be persistent. For example, processes associated with the dialer application 821, may also be persistent.

The processes implemented by the operating system kernel 800 may generally be categorized as system services processes 801, dialer processes 802, browser processes 804, and maps processes 805. The system services processes 801 include status bar processes 806 associated with the status bar 739; application launcher processes 807 associated with the application launcher 740; package manager processes 809 associated with the package manager 741; activity manager processes 810 associated with the activity manager 746; resource manager processes 811 associated with a resource manager 811 that provides access to graphics, localized strings, and XML layout descriptions; notification manger processes 812 associated with the notification manager 744; window manager processes 814 associated with the window manager 745; core JAVA libraries processes 815 associated with the core JAVA libraries 731; surface manager processes 816 associated with the surface manager 721; Dalvik virtual machine processes 817 associated with the Dalvik virtual machine 732, and LIBC processes 819 associated with the LIBC library 725.

The dialer processes 802 include dialer application processes 821 associated with the dialer application 749; telephony manager processes 822 associated with the telephony manager 742; core JAVA libraries processes 824 associated with the core JAVA libraries 731; Dalvik virtual machine processes 825 associated with the Dalvik Virtual machine 732; and LIBC processes 826 associated with the LIBC library 725. The browser processes 804 include browser application processes 827 associated with the browser application 751; core JAVA libraries processes 829 associated with the core JAVA libraries 731; Dalvik virtual machine processes 830 associated with the Dalvik virtual machine 732; LIBWEBCORE processes 831 associated with the LIBWEBCORE library 726; and LIBC processes 832 associated with the LIBC library 725.

The maps processes 805 include maps application processes 834, core JAVA libraries processes 835, Dalvik virtual machine processes 836, and LIBC processes 837. Notably, some processes, such as the Dalvik virtual machine processes, may exist within one or more of the systems services processes 801, the dialer processes 802, the browser processes 804, and the maps processes 805.

Figure 9:
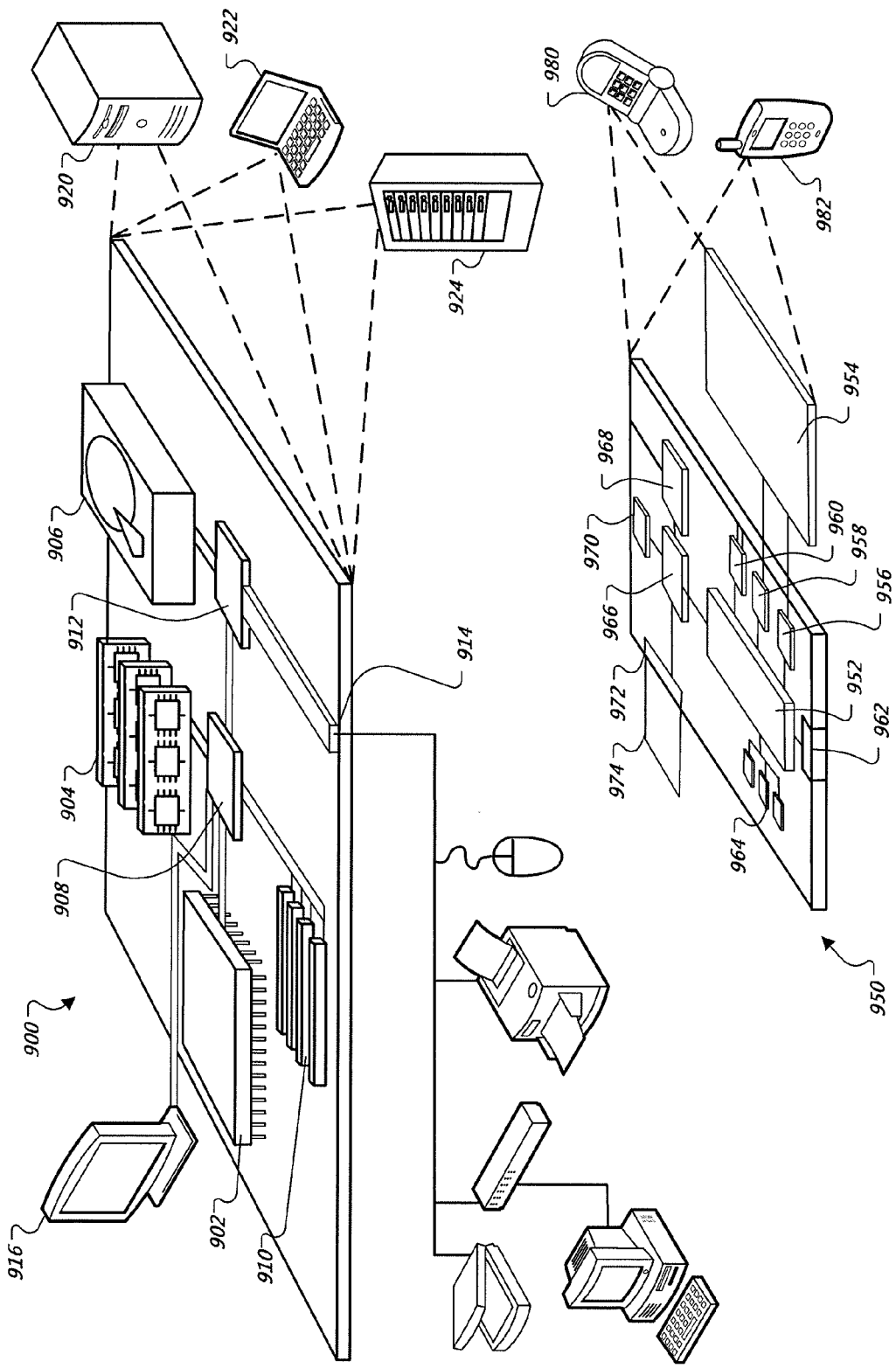
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radiofrequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
    displaying, on an electronic display of a computing device, a plurality of graphical elements;
    receiving, based on user input, a first selection of a first graphical element from among the plurality of graphical elements, the first graphical element being associated with one or more long-press operations that are configured to be activated responsive to selections of the first graphical element that persist for a first pre-determined period of time;
    in response to receiving the first selection of the first graphical element, changing the display of the first graphical element from having a first visual appearance to having a second visual appearance that is different than the first visual appearance, wherein the second visual appearance indicates that the first graphical element is associated with the one or more long press operations, wherein the first graphical element is changed to have the second visual appearance for a second period of time before the one or more long-press operations are activate;
    identifying that the first selection of the first graphical element has persisted for at least the first pre-determined period of time;
    in response to identifying that the first selection of the first graphical element has persisted for at least the first pre-determined period of time, activating the one or more long-press operations;
    receiving, based on user input, a first selection of a second graphical element, the second graphical element not being associated with long-press operations, the first selection of the second graphical element persisting for at least the first pre-determined period of time; and
    in response to receiving the first selection of the second graphical element, performing a short-press operation with the computing device without changing the display of the second graphical element in a manner that would indicate that the second graphical element is associated with long-press operations.

2. The computer-implemented method of claim 1, further comprising:
    receiving, based on user input, a second selection of the first graphical element, the second selection of the first graphical element persisting for less than the first pre-determined period of time; and
    in response to receiving the second selection of the first graphical element, performing, with the computing device, a short-press operation.

3. The computer-implemented method of claim 1, wherein activating the one or more long-press operations comprises displaying a pop-up menu having one or more graphical elements corresponding to the one or more long-press operations.

4. The computer-implemented method of claim 1, wherein activating the one or more long-press operations comprises causing at least one of the one or more long-press operations to be performed.

5. The computer-implemented method of claim 1, wherein the first graphical element comprises at least one of a button, user-selectable text, and an icon.

6. The computer-implemented method of claim 1, wherein changing the display of the first graphical element from having the first visual appearance to having the second visual appearance comprises highlighting the first graphical element for the second period of time to distinguish the first graphical element from other ones of the plurality of graphical elements.

7. The computer-implemented method of claim 6, wherein highlighting the first graphical element comprises at least one of increasing a size of the first graphical element, changing a brightness of the first graphical element, changing a color of the first graphical element, and causing the first graphical element to jiggle.

8. The computer-implemented method of claim 1, further comprising, in response to receiving the first selection of the first graphical element, providing haptic feedback to a user, the first haptic feedback indicating that the first graphical element is associated with the one or more long-press operations.

9. The computer-implemented method of claim 1, further comprising delaying the change in display of the first graphical element for a third period of time following the first selection of the first graphical element, wherein the third period of time is less than the first period of time.

10. The computer-implemented method of claim 9, wherein the third period of time is greater than an amount of time required for user input to complete a short-press selection of the first graphical element, wherein the short-press selection comprises a non-persistent tap or click of the first graphical element.

11. The computer-implemented method of claim 1, wherein the electronic display comprises a touch screen display, and wherein receiving the first selection of the first graphical element comprises identifying that the first graphical element has been selected from user input on the touch screen display.

12. One or more non-transitory computer-readable media having instructions stored thereon that, when executed by one or more processors of a computing device, cause performance of operations comprising:
    displaying, on an electronic display of the computing device, a plurality of graphical elements;

receiving, based on user input, a first selection of a first graphical element from among the plurality of graphical elements, the first graphical element being associated with one or more long-press operations that are configured to be activated responsive to selections of the first graphical element that persist for a first pre-determined period of time;

in response to receiving the first selection of the first graphical element changing the display of the first graphical element from having a first visual appearance to having a second visual appearance that is different than the first visual appearance, the second visual appearance indicates that the first graphical element is associated with the one or more long press operations, wherein the first graphical element is changed to have the second visual appearance for a second period of time before the one or more long-press operations are activate;

identifying that the first selection of the first graphical element has persisted for at least the first pre-determined period of time;

in response to identifying that the first selection of the first graphical element has persisted for at least the first pre-determined period of time, activating the one or more long-press operations;

receiving, based on user input, a first selection of a second graphical element, the second graphical element not being associated with long-press operations, the first selection of the second graphical element persisting for at least the first pre-determined period of time; and in response to receiving the first selection of the second graphical element, performing a short-press operation with the computing device without changing the display of the second graphical element in a manner that would indicate that the second graphical element is associated with long-press operations.

13. The one or more non-transitory computer-readable media of claim 12, wherein the operations further comprise:

receiving, based on user input, a second selection of the first graphical element, the second selection of the first graphical element persisting for less than the first pre-determined period of time;

and in response to receiving the second selection of the first graphical element, performing, with the computing device, a short-press operation.

14. The one or more non-transitory computer-readable media of claim 12, wherein activating the one or more long-press operations comprises displaying a pop-up menu having one or more graphical elements corresponding to the one or more long-press operations.

15. The one or more non-transitory computer-readable media of claim 12, wherein the first graphical element comprises at least one of a button, user-selectable text, and an icon.

16. The one or more non-transitory computer-readable media of claim 12, wherein changing the display of the first graphical element from having the first visual appearance to having the second visual appearance comprises highlighting the first graphical element for the second period of time to distinguish the first graphical element from other ones of the plurality of graphical elements.

17. The one or more non-transitory computer-readable media of claim 16, wherein highlighting the first graphical element comprises at least one of increasing a size of the first graphical element, changing a brightness of the first graphical element, changing a color of the first graphical element, and causing the first graphical element to jiggle.

18. The one or more non-transitory computer-readable media of claim 12, wherein the operations further comprise delaying the change in display of the first graphical element for a third period of time following the first selection of the first graphical element, wherein the third period of time is less than the first period of time.

19. The one or more non-transitory computer-readable media of claim 18, wherein the third period of time is greater than an amount of time required for user input to complete a short-press selection of the first graphical element, wherein the short-press selection comprises a non-persistent tap or click of the first graphical element.

* * * * *

UNITED STATES PATENT AND TRADEMARK OFFICE
CERTIFICATE OF CORRECTION

PATENT NO. : 8,954,887 B1  
APPLICATION NO. : 12/367842  
DATED : February 10, 2015  
INVENTOR(S) : Erick Tseng et al.

Page 1 of 1

It is certified that error appears in the above-identified patent and that said Letters Patent is hereby corrected as shown below:

In the Claims:

Column 21, line 52, in Claim 1 delete "activate" and insert -- activated --, therefor.

Column 23, line 16, in Claim 12 delete "activate" and insert -- activated --, therefor.

Signed and Sealed this
Twenty-eighth Day of April, 2015

Michelle K. Lee
*Director of the United States Patent and Trademark Office*